(12) United States Patent
Aoki et al.

(10) Patent No.: US 7,703,692 B2
(45) Date of Patent: Apr. 27, 2010

(54) MEMORY CARD

(75) Inventors: Yoshitaka Aoki, Kanagawa (JP); Keiichi Tsutsui, Kanagawa (JP)

(73) Assignee: Sony Corporation (JP)

( * ) Notice: Subject to any disclaimer, the term of this patent is extended or adjusted under 35 U.S.C. 154(b) by 116 days.

(21) Appl. No.: 11/985,508

(22) Filed: Nov. 15, 2007

(65) Prior Publication Data

US 2008/0135628 A1 Jun. 12, 2008

(30) Foreign Application Priority Data

Dec. 6, 2006 (JP) ............................. P2006-328973

(51) Int. Cl.
G06K 19/06 (2006.01)
G06K 5/00 (2006.01)
G06K 7/08 (2006.01)
G06K 19/00 (2006.01)
H05K 1/14 (2006.01)

(52) U.S. Cl. ................. 235/492; 235/380; 235/451; 235/487; 361/737; 439/945; 439/946

(58) Field of Classification Search .............. 235/492, 235/487; 361/737; 439/945
See application file for complete search history.

(56) References Cited

U.S. PATENT DOCUMENTS

| 6,719,589 | B2 | 4/2004 | Nishio et al. | |
| 6,738,259 | B2* | 5/2004 | Le et al. | 361/737 |
| 6,945,465 | B2 | 9/2005 | Nishizawa et al. | |
| 6,994,573 | B2 | 2/2006 | Tanaka et al. | |
| 7,048,197 | B2 | 5/2006 | Nishizawa et al. | |
| 7,320,622 | B2* | 1/2008 | Ying et al. | 439/630 |
| 2005/0253239 | A1* | 11/2005 | Nishizawa et al. | 257/679 |

FOREIGN PATENT DOCUMENTS

| JP | 6-325820 A | 11/1994 |
| JP | 2001-209773 A | 8/2001 |
| JP | 2003-086296 A | 3/2003 |
| JP | 2004-071175 A | 3/2004 |
| JP | 2004-264908 A | 9/2004 |

OTHER PUBLICATIONS

On-The-Go Supplement to the USB 2.0 Specification, Revision 1.0; Dec. 18, 2001.*
USB 2.0 Specification Engineering Change Notice (ECN) #1: Mini-B Connector; Oct. 10, 2000.*

* cited by examiner

Primary Examiner—Steven S Paik
Assistant Examiner—Christopher Stanford
(74) Attorney, Agent, or Firm—Lerner, David, Littenberg, Krumholz & Mentlik, LLP

(57) ABSTRACT

Disclosed herein is a memory card that is a second memory card provided in connection with a first memory card. The first and second memory cards include: a body portion having the shape of a rectangular plate; and guide portions that project from both sides of the body portion in a width direction of the body portion and extend in a longitudinal direction of the body portion. Each guide portion has a thickness less than a thickness of the body portion. The first and second memory cards are equal in thickness and length of the body portion and distance between tips of the guide portions. The body portion of the second memory card has a width greater than a width of the body portion of the first memory card.

10 Claims, 17 Drawing Sheets

FIG.7A

| CONTACT | SIGNAL NAME | SIGNAL NAME | CONTACT |
|---|---|---|---|
| 16-1 | BS | | |
| 16-2 | DATA1 | - | 16-12 |
| 16-3 | DATA0 | DATA5 | 16-13 |
| 16-4 | DATA2 | DATA4 | 16-14 |
| 16-5 | INS | DATA6 | 16-15 |
| 16-6 | DATA3 | DATA7 | 16-16 |
| 16-7 | SCLK | - | 16-17 |
| 16-8 | Vcc | - | 16-18 |
| 16-9 | Vss | - | 16-19 |
| 16-10 | UNUSED | - | 16-20 |
| 16-11 | UNUSED | | |

FIG.7B

| CONTACT | SIGNAL NAME | SIGNAL NAME | CONTACT |
|---|---|---|---|
| 16-1 | BS | | |
| 16-2 | DATA1 | - | 16-12 |
| 16-3 | DATA0 | DATA5 | 16-13 |
| 16-4 | DATA2 | DATA4 | 16-14 |
| 16-5 | INS | - | 16-15 |
| 16-6 | DATA3 | - | 16-16 |
| 16-7 | SCLK | - | 16-17 |
| 16-8 | Vcc | - | 16-18 |
| 16-9 | Vss | DATA6 | 16-19 |
| 16-10 | | DATA7 | 16-20 |
| 16-11 | | | |

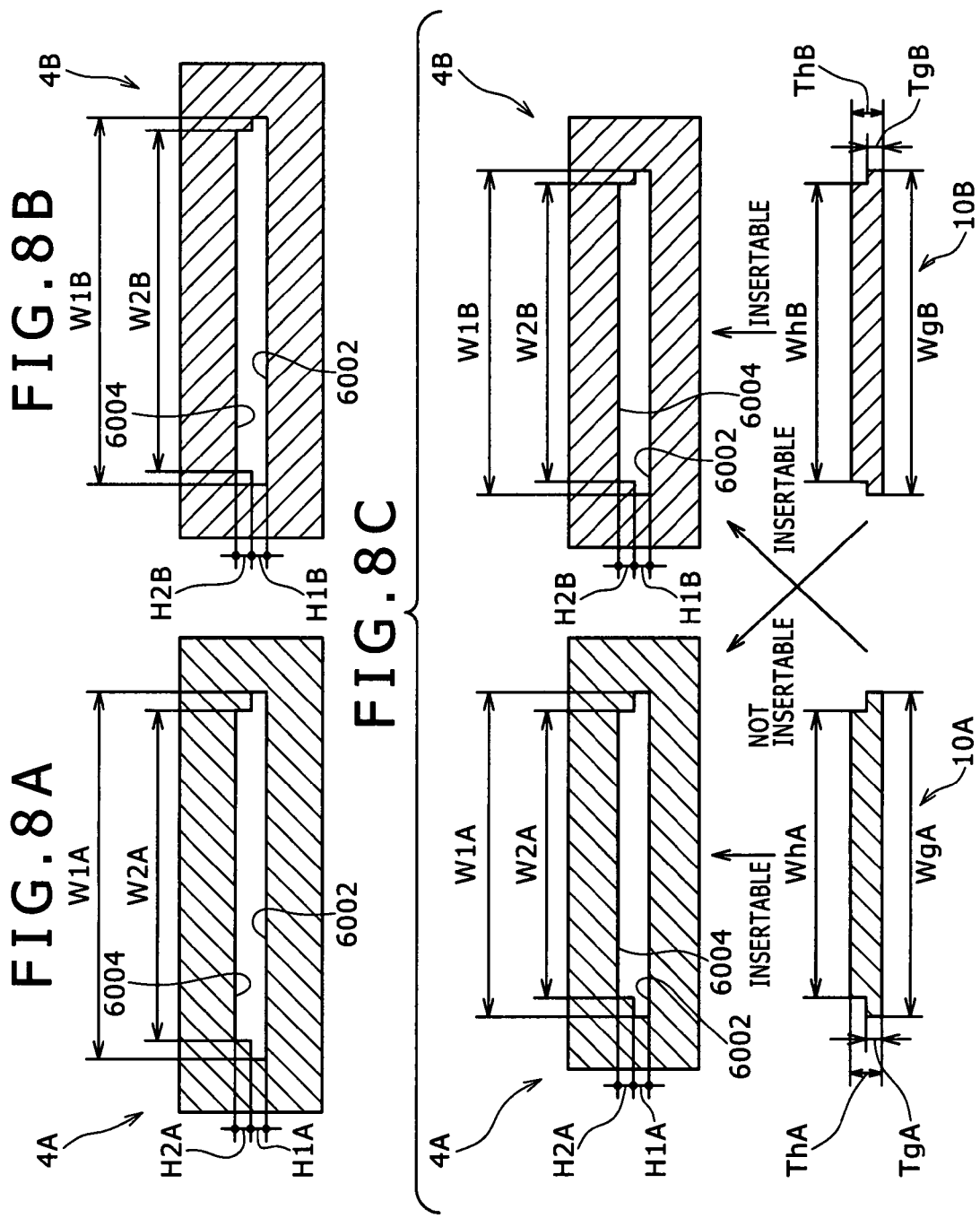

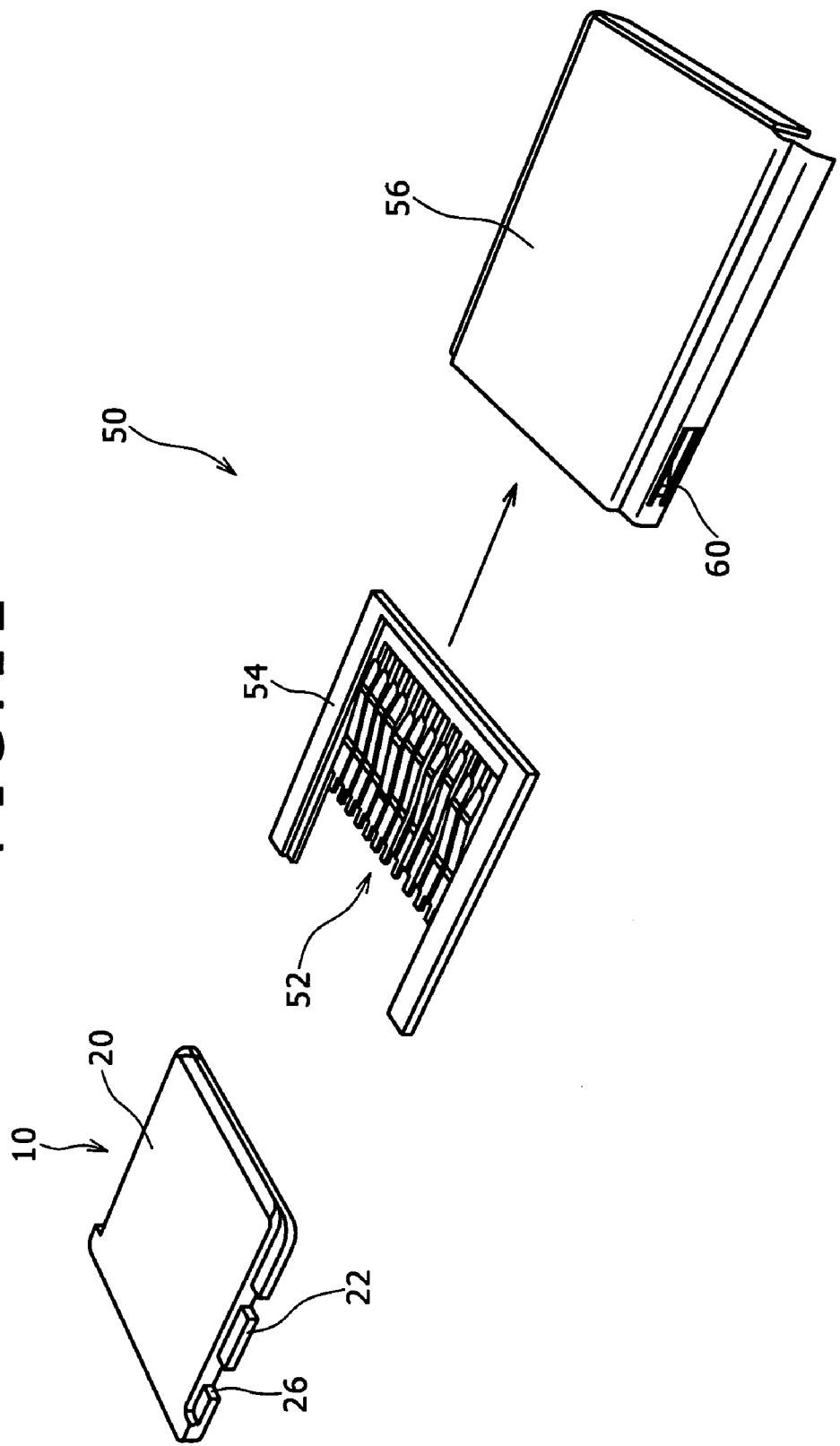

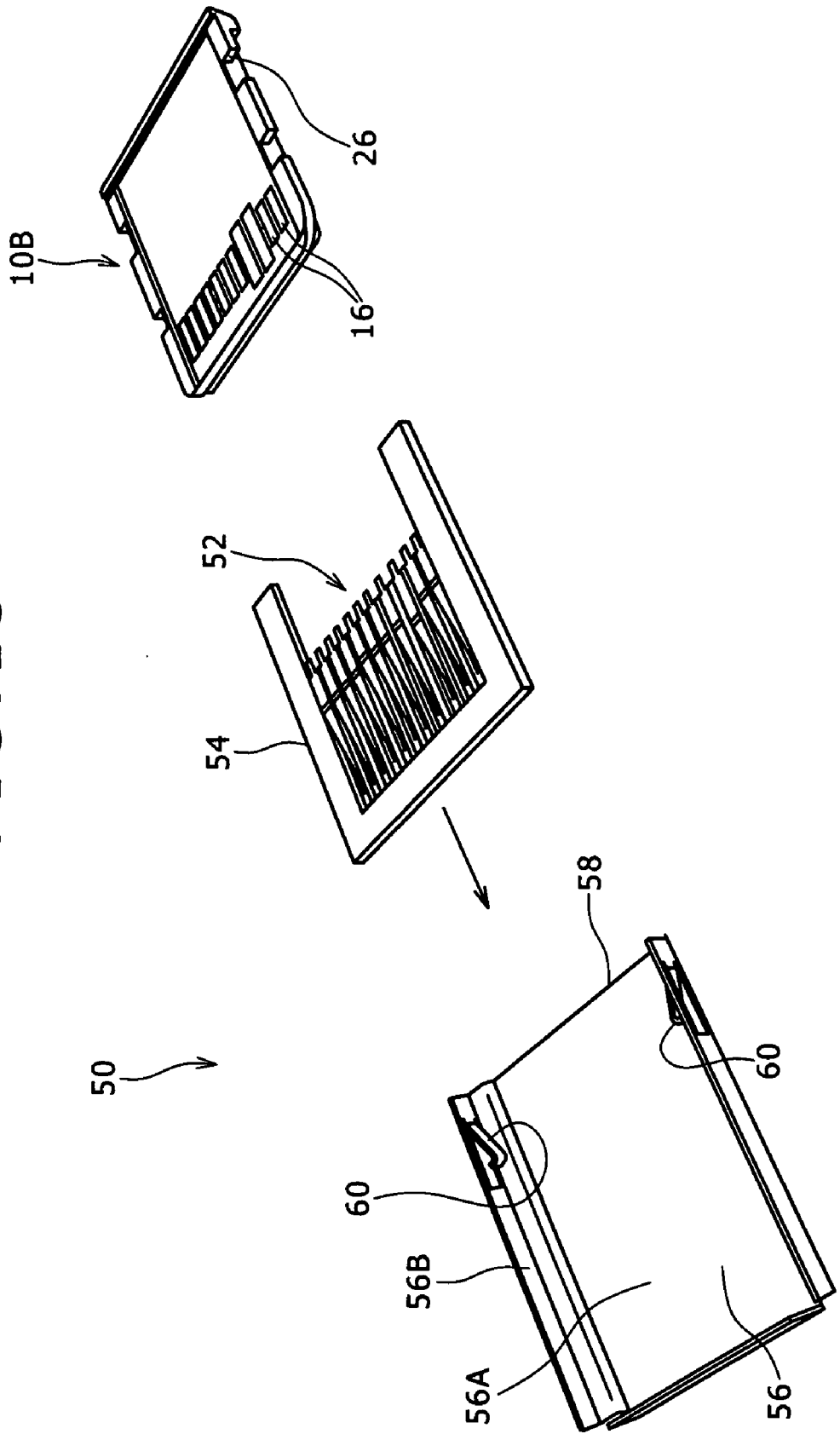

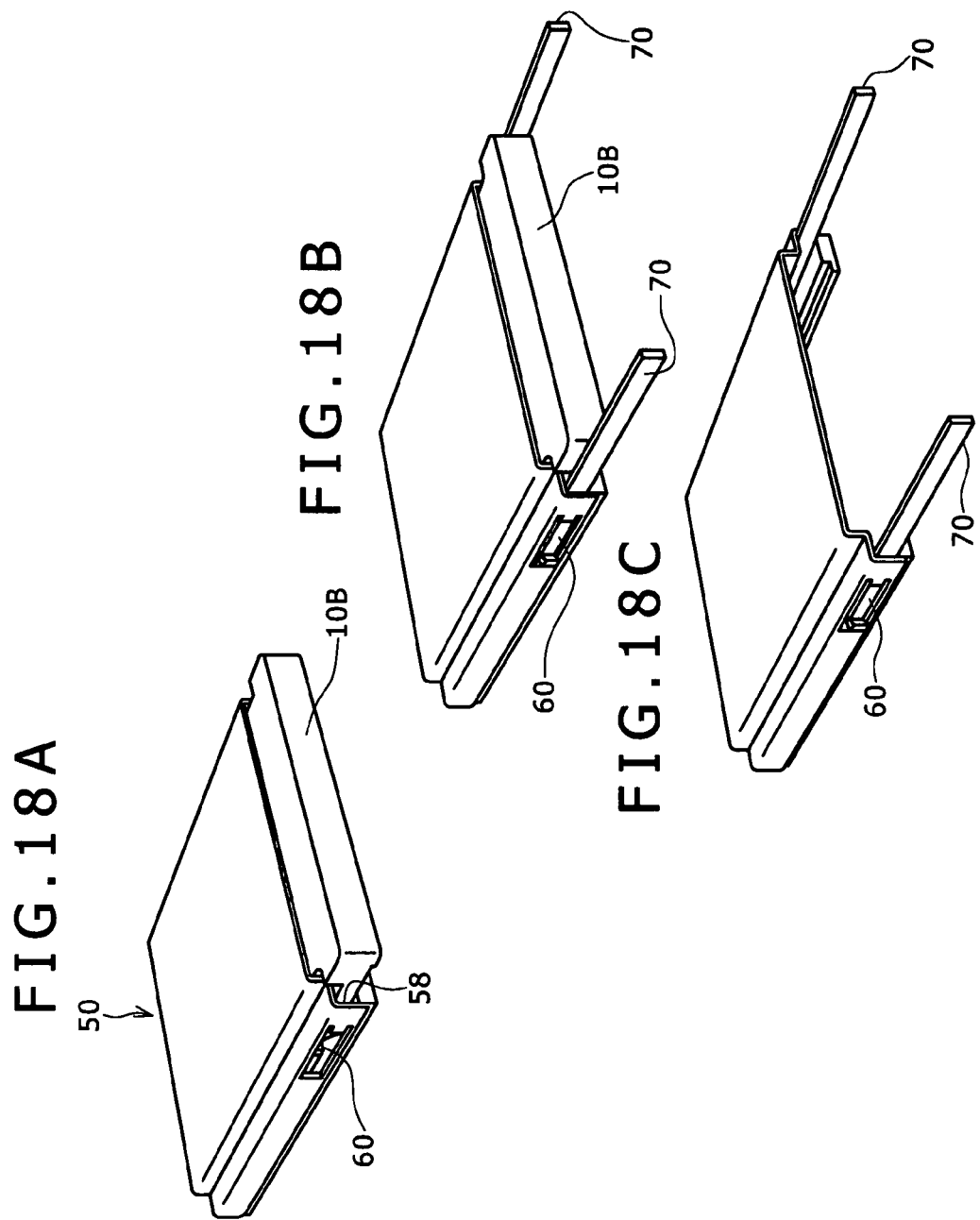

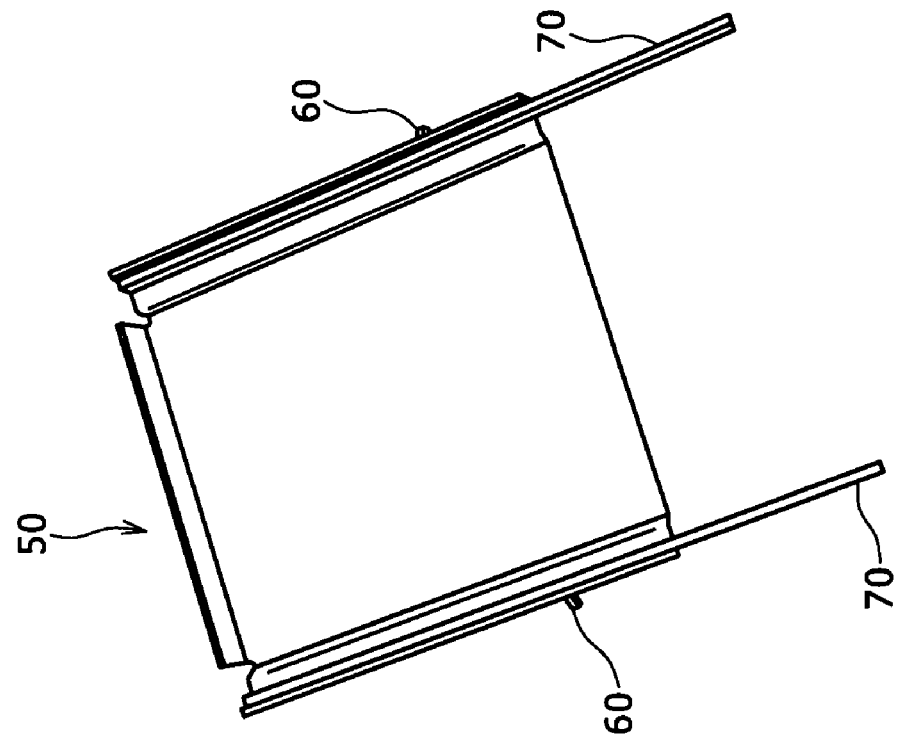
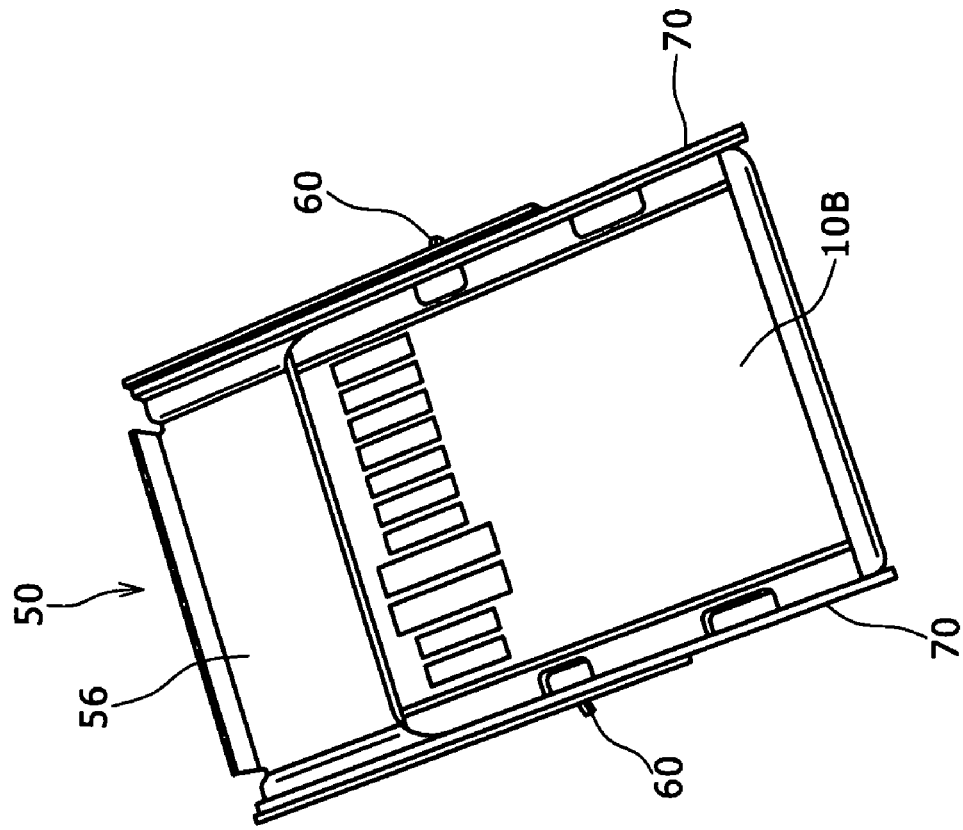

MEMORY CARD

CROSS-REFERENCE TO RELATED APPLICATIONS

The present application claims priority from Japanese Patent Application No. JP 2006-328973, filed in the Japanese Patent Office on Dec. 6, 2006, the entire content of which is incorporated herein by reference.

BACKGROUND OF THE INVENTION

1. Field of the Invention

The present invention relates to a memory card.

2. Description of the Related Art

There has been proposed a memory card that contains flash memory capable of data rewriting, and writes data to the flash memory and reads the data from the flash memory (see Japanese Patent Laid-open No. 2001-209773).

Meanwhile, there are two types of flash memory on the market. One type of flash memory is compatible with a portable electronic device that operates at a low power supply voltage (e.g., 1.8 V), and the other type of flash memory is compatible with an electronic device that operates at a normal power supply voltage (e.g., 3.3 V), which is higher than the low power supply voltage.

As such, there has been proposed a dual-purpose memory card that is compatible with both the electronic device that operates at the low power supply voltage and the electronic device that operates at the normal power supply voltage. This dual-purpose memory card is equipped with the flash memory that operates at the low power supply voltage and a step-down circuit that steps down the normal power supply voltage to a lower voltage.

SUMMARY OF THE INVENTION

However, it is planned that, regarding some types of flash memory designed for memory cards, production of the flash memory compatible with the portable electronic device that operates at the low power supply voltage (e.g., 1.8 V) will be stopped while the flash memory compatible with the electronic device that operates at the normal power supply voltage (e.g., 3.3 V) will continue to be produced. Accordingly, there is a desire for an introduction of a novel memory card that uses flash memory capable of operating only at the normal power supply voltage, while the above dual-purpose memory card remains available.

Therefore, if the two types of memory cards, i.e., the known dual-purpose memory card and the novel memory card, are on the market, it may happen that a user attempts to use a wrong combination of a memory card and an electronic device, resulting in failure of a proper voltage to be supplied to the memory card and therefore in malfunction such as the memory card not operating.

In such a situation, the present invention has been devised to provide a memory card that has an advantage in ensuring the prevention of malfunction of the two types of memory cards. The present invention also provides an electronic device that allows use of the two types of memory cards.

According to one embodiment of the present invention, there is provided a memory card that is a second memory card provided in connection with a first memory card that includes a body portion having the shape of a rectangular plate, and guide portions that project from both sides of the body portion in a width direction of the body portion and extend in a longitudinal direction of the body portion. Each of the guide portions has a thickness less than a thickness of the body portion. The second memory card includes: a body portion having the shape of a rectangular plate; and guide portions that project from both sides of the body portion in a width direction of the body portion and extend in a longitudinal direction of the body portion. The body portion of the second memory card is equal in thickness and length to the body portion of the first memory card. A distance between tips of the guide portions of the second memory card is equal to a distance between tips of the guide portions of the first memory card. The body portion of the second memory card has a width greater than a width of the body portion of the first memory card.

According to another embodiment of the present invention, there is provided an electronic device including a slot configured to receive two types of memory cards having different dimensions. The two types of memory cards include: a body portion having the shape of a rectangular plate; and guide portions that project from both sides of the body portion in a width direction of the body portion and extend in a longitudinal direction of the body portion. Each of the guide portions has a thickness less than a thickness of the body portion. The two types of memory cards are equal in thickness and length of the body portion and distance between tips of the guide portions at the both sides of the body portion, and are different in width of the body portion. The slot includes: a first housing portion configured to receive the guide portions at the both sides of the body portion and a part of the body portion that corresponds in level and thickness to the guide portions; and a second housing portion configured to receive the remaining part of the body portion.

The memory card according to the present invention has a very simple structure. The second memory card is simply different from the first memory card in that the width of the body portion of the second memory card is greater than the width of the body portion of the first memory card. This very simple structural difference allows the first memory card to be inserted into a card slot of an electronic device that is compatible with the second memory card, and at the same time prevents the second memory card from being inserted into a card slot of an electronic device that is not compatible with the second memory card. This contributes to ensuring the prevention of malfunction such as failure of the second memory card to operate as a result of the second memory card being inserted into an electronic device that does not have a compatible power supply.

The electronic device according to the present embodiment allows use of both first and second memory cards.

BRIEF DESCRIPTION OF THE DRAWINGS

FIG. 7A is a table showing one example of correspondence between contacts of the memory cards and signal names;

FIG. 7B is a table showing another example of the correspondence between the contacts of the memory cards and signal names;

FIG. 8A is a diagram illustrating a cross section of a first card slot designed for the old memory card;

FIG. 8B is a diagram illustrating a cross section of a second card slot into which both the old memory card and the new memory card can be inserted;

FIG. 8C is a diagram illustrating correspondence between the old and new memory cards and the first and second card slots;

FIGS. 12 and 13 are exploded perspective views of the new memory card and a card slot;

FIGS. 18A, 18B, 18C, 19A, and 19B are diagrams illustrating an operation of removing the new memory card from the card slot;

DETAILED DESCRIPTION OF THE PREFERRED EMBODIMENTS

First Embodiment

Next, a first embodiment of the present invention will be described below with reference to the accompanying drawings.

In the present embodiment, the format of memory cards is assumed to be the Memory Stick Micro (a registered trademark of Sony Corporation) by way of example.

Electrical configurations of an old memory card and a new memory card will be described first, and thereafter, structures of the old memory card and the new memory card will be described. Note that the old memory card corresponds to a "first memory card" as recited in the appended claims while the new memory card corresponds to a "second memory card" as recited in the appended claims.

Figure 1:
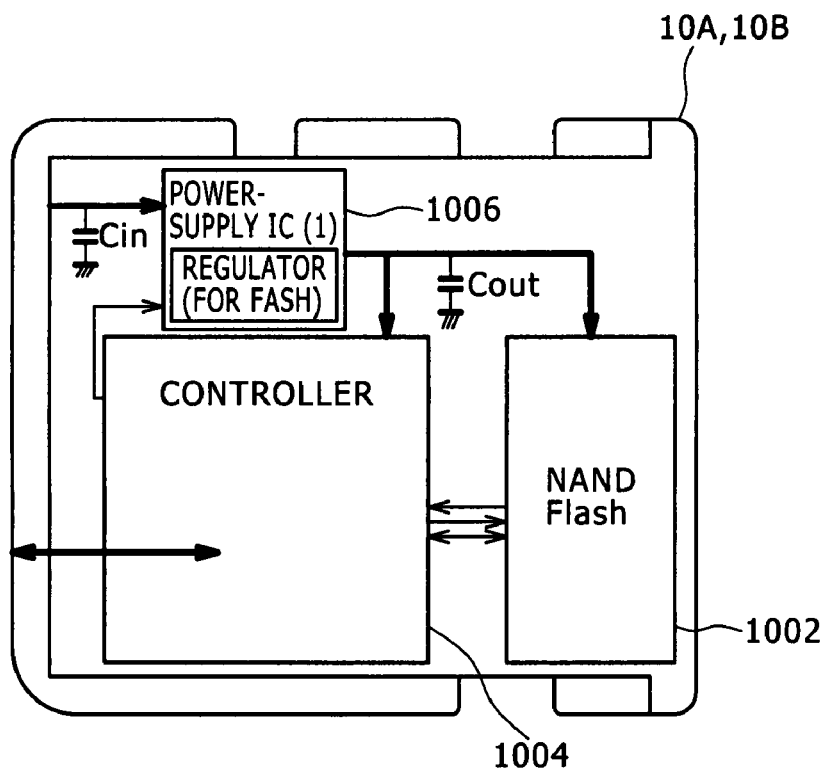
FIG. 1 is a schematic block diagram illustrating a structure of an old memory card and a new memory card.
Figure 2:
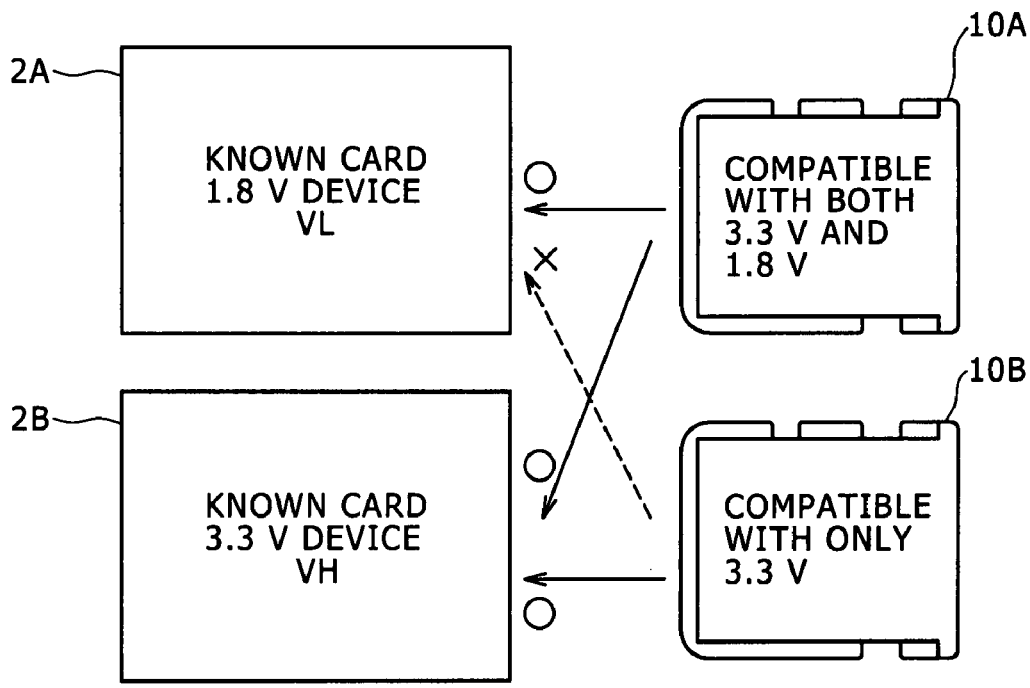
FIG. 2 is a diagram illustrating correspondences between the old and new memory cards and external devices.

FIG. 1 is a schematic block diagram illustrating a structure of an old memory card 10A and a new memory card 10B. FIG. 2 is a diagram illustrating correspondences between the old and new memory cards 10A and 10B and external devices.

First, the old memory card 10A will be described. The old memory card 10A is a dual-purpose memory card that is compatible with both a portable electronic device that operates at a low power supply voltage (e.g., 1.8 V) and an electronic device that operates at a normal power supply voltage (e.g., 3.3 V), which is higher than the low power supply voltage.

Referring to FIG. 1, the old memory card 10A includes a storage section 1002, a controller 1004, and a power-supply IC 1006.

The storage section 1002 is capable of writing and/or reading data, and, in the present embodiment, is formed by NAND flash memory.

The storage section 1002 of the old memory card 10A operates at a low power supply voltage VL (e.g., 1.8 V).

The controller 1004 performs data communication with an electronic device via a contact 16 (see FIG. 3) to write and/or read data to or from the storage section 1002.

The controller 1004 of the old memory card 10A also operates at the low power supply voltage VL.

The power-supply IC 1006 has a function of stabilizing a power supply voltage supplied via the contact 16 (see FIG. 3) from the electronic device in which the old memory card 10A is placed, and converting the voltage as described below.

Specifically, in the case where the power supply voltage supplied via the contact 16 (see FIG. 3) from the electronic device in which the old memory card 10A is placed is the low power supply voltage VL, the power-supply IC 1006 stabilizes the low power supply voltage VL and supplies the stabilized voltage to the storage section 1002 and the controller 1004.

Meanwhile, in the case where the power supply voltage supplied from the electronic device in which the old memory card 10A is placed is a normal power supply voltage VH higher than the low power supply voltage VL, the power-supply IC 1006 steps down the normal power supply voltage VH to the low power supply voltage VL and stabilizes it, and supplies the stabilized voltage to the storage section 1002 and the controller 1004.

Accordingly, referring to FIG. 2, the old memory card 10A can be loaded into both an electronic device 2A that operates at the low power supply voltage VL and an electronic device 2B that operates at the normal power supply voltage VH to operate successfully.

Next, the new memory card 10B, which operates only at the normal power supply voltage (i.e., is compatible with only an electronic device that operates at the normal power supply voltage (e.g., 3.3 V) higher than the low power supply voltage), will now be described below.

A storage section 1002 of the new memory card 10B operates at the normal power supply voltage VH, but, in the other functional respects, is identical to the storage section 1002 of the old memory card 10A.

A controller 1004 of the new memory card 10B that is compatible with only the normal power supply voltage operates at the normal power supply voltage VH, and, in the other functional respects, is identical to the controller 1004 of the old memory card 10A.

A power-supply IC 1006 of the new memory card 10B stabilizes the normal power supply voltage VH supplied from the electronic device, and supplies the stabilized voltage to the storage section 1002 and the controller 1004, but does not have a function of stepping down the power supply voltage.

Accordingly, referring to FIG. 2, when placed in the electronic device 2B that supplies the normal power supply voltage VH, the new memory card 10B operates normally because the normal power supply voltage VH is supplied to the storage section 1002 and the controller 1004 via the power-supply IC 1006.

On the other hand, when placed in the electronic device 2A that supplies the low power supply voltage VL, the new memory card 10B does not operate normally because the normal power supply voltage VH is not supplied to the storage section 1002 or the controller 1004.

In order to prevent such a situation, the new memory card 10B according to the present embodiment is so structured that the new memory card 10B can be loaded only to the electronic device 2B that supplies the normal power supply voltage VH but not to the electronic device 2A that supplies the low power supply voltage VL. Specifically, the new memory card 10B has a structure described below.

Figure 3:
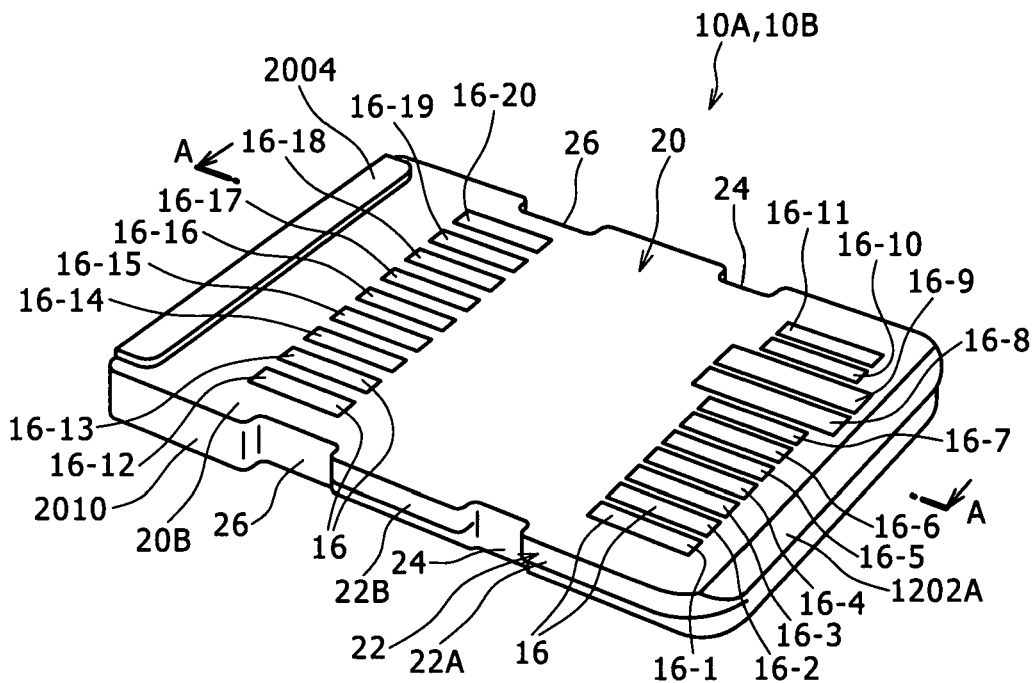
FIG. 3 is a perspective view of the old memory card and the new memory card as viewed from the above.
Figure 4:
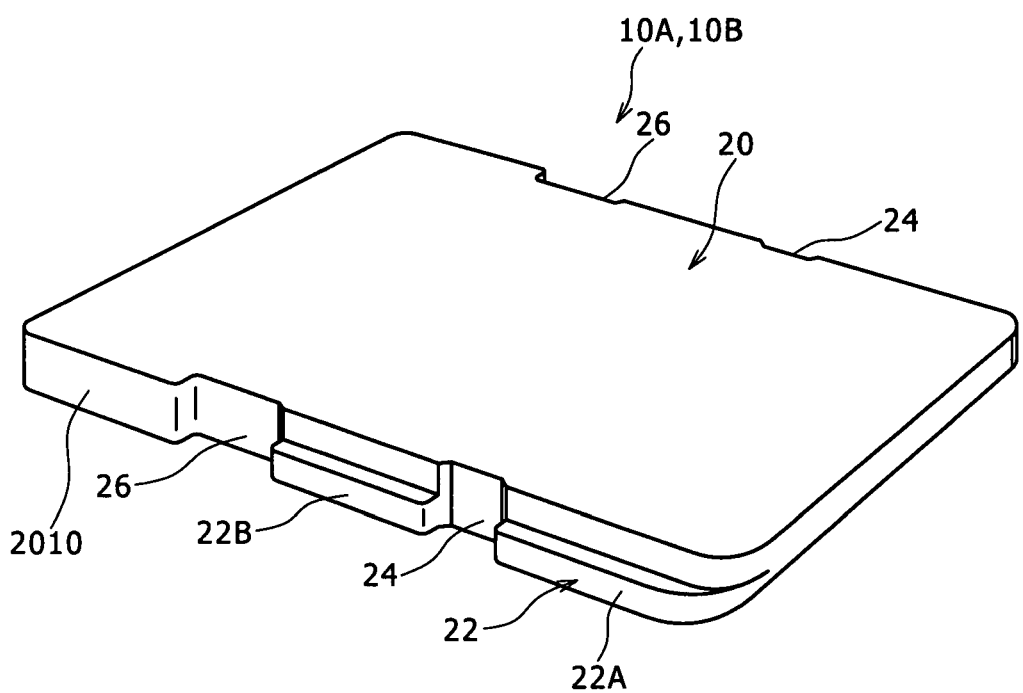
FIG. 4 is a perspective view of the old memory card and the new memory card as turned upside down.
Figure 5:
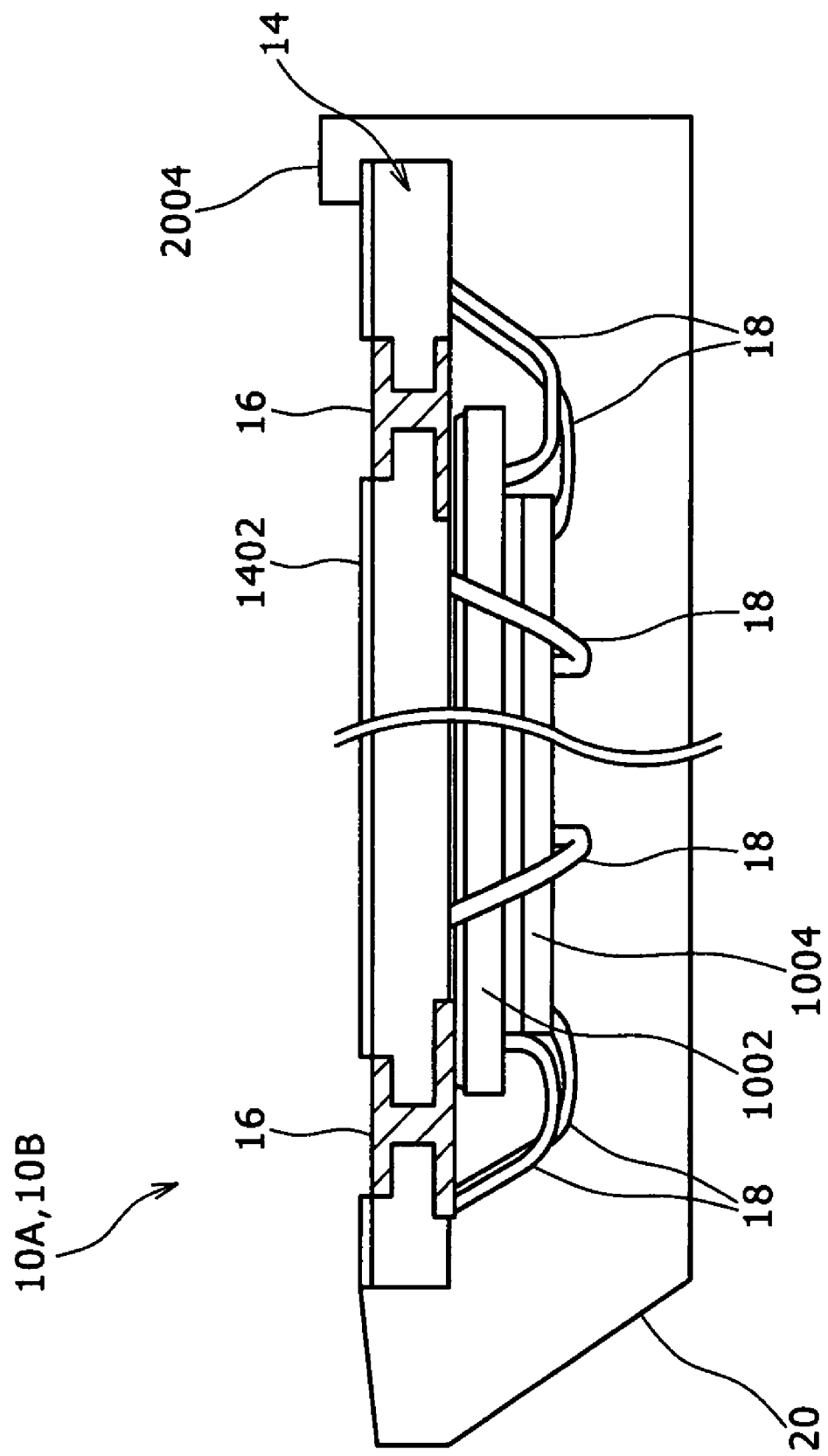
FIG. 5 is a cross-sectional view of the old memory card and the new memory card taken along line A-A of FIG. 3.

FIG. 3 is a perspective view of the old memory card 10A and the new memory card 10B as viewed from the above. FIG. 4 is a perspective view of the old memory card 10A and the new memory card 10B as turned upside down. FIG. 5 is a cross-sectional view of the old memory card 10A and the new memory card 10B taken along line A-A of FIG. 3.

Referring to FIGS. 3 and 4, the memory cards 10A and 10B assumes the shape of a rectangular plate with a width and length greater in magnitude than a thickness.

The memory cards 10A and 10B have a body portion 20 and guide portions 22. The guide portions 22 project from both sides of the body portion 20 in a width direction of the body portion 20, and extend in a longitudinal direction of the body portion 20.

The body portion 20 is formed of an insulating synthetic resin. As the synthetic resin, various known synthetic resins, such as a thermosetting resin like an epoxy resin containing a glass fiber, can be adopted.

Referring to FIG. 5, the body portion 20 contains a substrate 14. The substrate 14 is buried in the body portion 20 so as to form one surface of the body portion 20.

The contacts 16, the storage section 1002, the controller 1004, and so on are provided on the substrate 14.

The plurality of contacts 16 are provided on a surface of the substrate 14 that forms the one surface of the body portion 20 such that the contacts 16 are arranged in the width direction of the memory card.

In the present embodiment, two sets of contacts 16 are provided close to both ends of the substrate 14 such that the contacts 16 are spaced from each other in the width direction.

Referring to FIG. 5, the storage section 1002 is buried in the body portion 20 so as to be attached to a lower surface of the substrate 14.

In the present embodiment, the storage section 1002 is formed by one or more flash memories depending on its storage capacity. In the case where the storage section 1002 is formed by a plurality of flash memories, the flash memories are joined to each other so as to be placed one upon another in the thickness direction.

The controller 1004 is placed on the storage section 1002, and is connected to the contacts 16.

Figure 6:
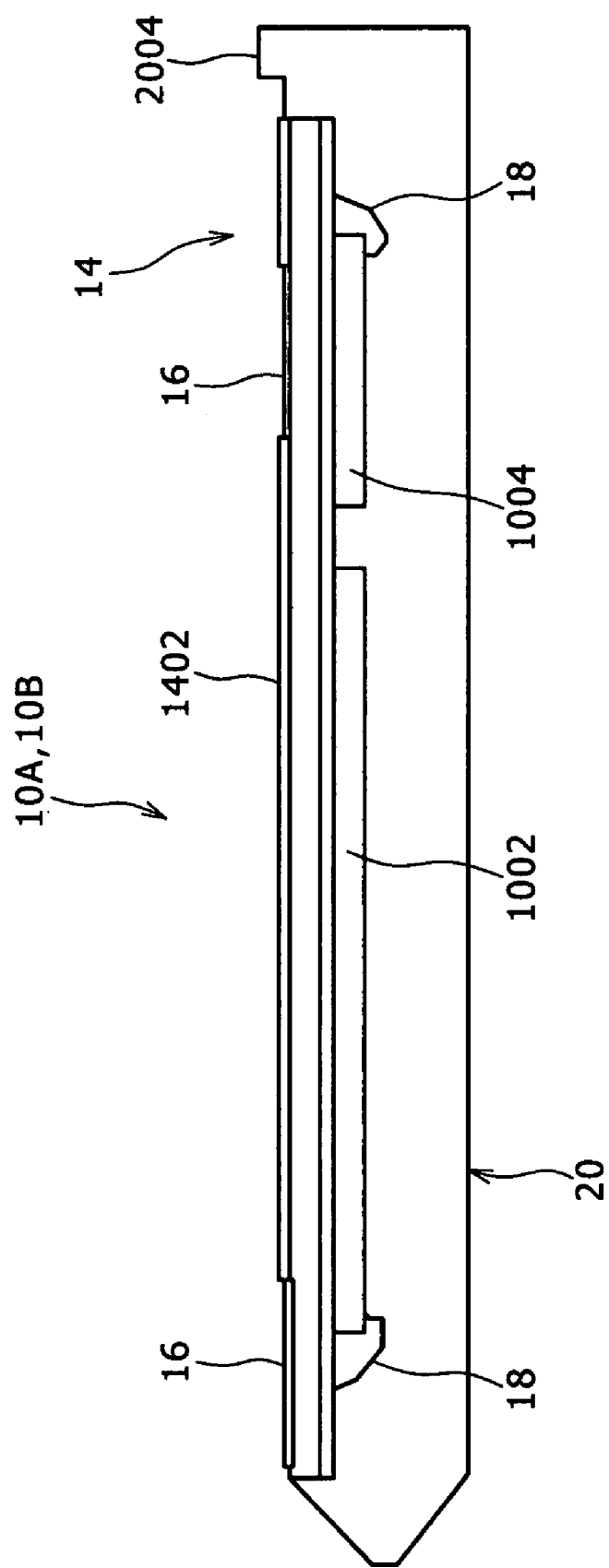
FIG. 6 is a cross-sectional view of another example of the old memory card and the new memory card.

While FIG. 5 illustrates a case where the controller 1004 is placed on the storage section 1002, the controller 1004 may be placed on the substrate 14 as is the storage section 1002, as illustrated in FIG. 6.

In FIGS. 5 and 6, reference numeral 1402 indicates a resist that is formed of an insulating material and covers the surface of the substrate 14. The resist 1402 has openings at positions corresponding to the contacts 16, and the contacts 16 are exposed through the openings.

Reference numeral 18 indicates bonding wires that connect electrically between the storage section 1002 and a pattern on the substrate 14, between the controller 1004 and the pattern on the substrate 14, between the storage section 1002 and the contacts 16, and between the controller 1004 and the contacts 16.

Although not shown in FIGS. 5 and 6, besides the storage section 1002 and the controller 1004, other electronic components, such as the power-supply IC 1006 (see FIG. 1), a resistor, and a capacitor, are also mounted on the substrate 14.

Referring to FIG. 3, a projection 2004 for finger-hooking use is provided at one end of the body portion and on the one surface of the body portion 20 on which the contacts 16 are provided. The projection 2004 projects from this surface and extends in the width direction. In order to facilitate explanation, the end of the body portion 20 at which the projection 2004 is provided will be referred to as a rear end, while the opposite end at which the projection 2004 is not provided will be referred to as a front end.

Note that the projection 2004 for finger-hooking use is not provided on the old memory card 10A, but provided on the new memory card 10B.

Bulging portions 2010 are provided at both sides of the body portion 20 so as to be adjacent to the rear end. the bulging portions 2010 project from the respective sides of the body portion 20 to the same extent that the guide portions 22 project, as described below. The bulging portions 2010 extend from the rear end of the body portion 20 in a forward direction.

At both sides of the body portion 20, the guide portions 22 project from a half portion of the body portion 20, and extend in the longitudinal direction of the body portion 20. The guide portions 22 have a thickness less than that of the body portion 20. The half portion is a plate-shaped portion that constitutes nearly half of the body portion 20 and includes the surface of the body portion 20 on which the contacts 16 are provided. In detail, the guide portions 22 range from the front end of the body portion 20 to a position closer to the rear end.

In the present embodiment, referring to FIGS. 3 and 4, at each side of the body portion 20, a first guide portion 22A and a second guide portion 22B are provided. The first guide portion 22A extends rearward from the front end of the body portion 20, and the second guide portion 22B extends rearward from a position spaced from and to the rear of a rear end of the first guide portion 22A.

A first recessed portion 24 is formed between the rear end of the first guide portion 22A and a front end of the second guide portion 22B. A second recessed portion 26 is formed between a rear end of the second guide portion 22B and a front end of the bulging portion 2010. In other words, the first and second recessed portions 24 and 26 result from the absence of the first or second guide portion 22A or 22B at their respective positions.

These guide portions 22 are provided to prevent the memory card from being inserted erroneously into a card connector or a card slot in an upside-down orientation.

The second recessed portion 26 is a place where a locking mechanism of the card connector or the card slot fits when the memory card 10A or 10B is placed in the card connector or the card slot. As a result of the locking mechanism fitting in the second recessed portion 26, the memory card 10A or 10B is fixed securely.

The two second recessed portions 26 are at the same longitudinal position, and positioned between the first recessed portion 24 and the projection 2004.

The first recessed portions 24 are provided to identify the type of the new memory card 10B or the like by being detected by a detection switch provided in the card connector or the card slot. Also, the first recessed portions 24 may be used to make a contact provided in the card connector or the card slot leave the contacts 16 of the memory card with the aid of a cam mechanism provided in the card connector or the card slot.

Next, referring to FIG. 7, the contacts 16 will now be described briefly below.

FIG. 7A is a table showing one example of correspondence between the contacts 16 of the memory card 10A or 10B and signal names.

As illustrated in FIG. 3, the contacts 16 are composed of twenty contacts 16-1 to 16-20. As shown in FIG. 7A, the contacts 16-10, 16-11, 16-12, and 16-17 to 16-20 are unused, while the remaining thirteen contacts are assigned a signal.

Specifically, the plurality of contacts 16 include signal terminals for sending and receiving signals to or from the controller 1004, a ground terminal for supplying a ground potential to the storage section 1002 and the controller 1004, and a power supply terminal for supplying a power supply voltage to the storage section 1002 and the controller 1004.

The contacts 16-1 to 16-7 and 16-13 to 16-16 are the signal terminals, the contact 16-8 is the power supply terminal, and the contact 16-9 is the ground terminal.

In detail, the contact 16-1 is a signal terminal through which a bus state signal BS that indicates separation of data communicated with data signals DATA0 to DATA3 is inputted.

The contact 16-2 is a signal terminal used for input and output of the data signal DATA1. The contact 16-3 is a signal terminal used for input and output of the data signal DATA0. The contact 16-4 is a signal terminal used for input and output of the data signal DATA2. The contact 16-6 is a signal terminal used for input and output of the data signal DATA3.

The contact 16-5 is an insertion/removal detection contact, and is a signal terminal for receiving and sending an INS signal used by the electronic device to detect the insertion/removal of the memory card.

The contact 16-7 is a signal terminal through which a clock signal SCLK is inputted. The bus state signal BS and the data signals DATA0 to DATA3 are communicated in synchronism with this clock signal SCLK.

The contact 16-8 is the power supply terminal through which a power supply voltage Vcc is supplied.

The contact 16-9 is the ground terminal connected to a ground level (Vss).

The contact 16-13 is a signal terminal used for input and output of DATA5. The contact 16-14 is a signal terminal used for input and output of DATA4. The contact 16-15 is a signal terminal used for input and output of DATA6. The contact 16-16 is a signal terminal used for input and output of DATA7.

The remaining contacts 16-10 to 16-12 and 16-17 to 16-20 are unused, and are provided for expansion purposes.

FIG. 7B is a table showing another example of the correspondence between the contacts 16 of the memory card 10A or 10B and signal names.

In the example of FIG. 7B, the contacts 16-1 to 16-11 are assigned the same signals as in the example of FIG. 7A.

The contact 16-13 is a signal terminal used for input and output of DATA5. The contact 16-14 is a signal terminal used for input and output of DATA4. The contact 16-19 is a signal terminal used for input and output of DATA6. The contact 16-20 is a signal terminal used for input and output of DATA7. The remaining contacts 16-12 and 16-15 to 16-18 are unused, and are provided for expansion purposes.

External shapes of the new memory card 10B and the old memory card 10A will now be described in detail below.

FIG. 8A is a diagram illustrating a cross section of a first card slot 4A designed for the old memory card 10A. FIG. 8B is a diagram illustrating a cross section of a second card slot 4B into which both the old memory card 10A and the new memory card 10B can be inserted. FIG. 8C is a diagram illustrating correspondence between the old and new memory cards 10A and 10B and the first and second card slots 4A and 4B.

Figure 21:
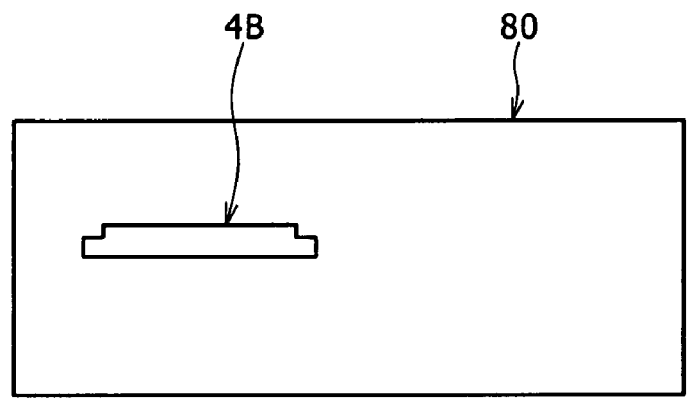
FIG. 21 is a front view of an electronic device that has the second card slot into which both the old memory card and the new memory card can be inserted.

FIG. 21 is a front view of an electronic device 80 that has the second card slot 4B into which both the old memory card 10A and the new memory card 10B can be inserted.

Referring to FIGS. 8B and 8C, the new memory card 10B is equal to the old memory card 10A in the thickness and length of the body portion 20 and the distance between tips of the guide portions 22 at both sides. However, the width of the body portion 20 of the new memory card 10B is greater than the width of the body portion 20 of the old memory card 10A.

Referring to FIG. 8C, details of the dimensions of the old and new memory cards 10A and 10B are described below.

Assume that, regarding the old memory card 10A, the thickness of the body portion 20 is ThA, the length of the body portion 20 is LA, the width of the body portion 20 is WhA, the thickness of the guide portion 22 is TgA, and the distance between the tips of the guide portions 22 at both sides is WgA, and that, regarding the new memory card 10B, the thickness of the body portion 20 is ThB, the length of the body portion 20 is LB, the width of the body portion 20 is WhB, the thickness of the guide portion 22 is TgB, and the distance between the tips of the guide portions 22 at both sides is WgB. Then, the following expressions hold: ThA=ThB, LA=LB, WhA<WhB, TgA=TgB, and WgA=WgB.

Examples of specific values thereof are as follows.
ThA=ThB=1.1 mm
LA=LB=15 mm
WhA=11 mm
WhB=11.6 mm
TgA=TgB=0.6 mm
WgA=WgB=12.5 mm Referring to FIG. 8A, the first card slot 4A supplies either the normal power supply voltage VH or the low power supply voltage VL to the memory card placed therein, and is provided in the electronic device that uses the old memory card 10A.

The first card slot 4A has a cross section that corresponds in shape to the cross section of the old memory card 10A.

Specifically, the first card slot 4A has a first housing portion 6002 and a second housing portion 6004. The first housing portion 6002 has dimensions corresponding to the thickness TgA of the guide portions 22 at both sides of the old memory card 10A and the distance WgA between the tips of the guide portions 22 at both sides of the old memory card 10A. The second housing portion 6004 has dimensions corresponding to the thickness (ThA-TgA) and width WhA of the half portion of the body portion 20.

In more detail, in order to allow the insertion and removal of the old memory card 10A into and from the first card slot 4A, the first housing portion 6002 has a height H1A slightly greater than the thickness TgA of the guide portion 22, and a width W1A slightly greater than the distance WgA between the tips of the guide portions 22 at both sides.

Also, the second housing portion 6004 has a height H2A slightly greater than the thickness (ThA-TgA) of the half portion of the body portion 20, and a width W2A slightly greater than the width WhA of the body portion 20.

Referring to FIG. 8B, the second card slot 4B supplies only the normal power supply voltage VH to the memory card placed therein, and as illustrated in FIG. 21, the second card slot 4B is provided in the electronic device 80 that uses both the old memory card 10A and the new memory card 10B. The second card slot 4B is so structured that both the old memory card 10A and the new memory card 10B can be inserted into and removed from the second card slot 4B. Here, examples of the electronic device 80 include a memory card reader/writer, a personal computer, a digital still camera, and a mobile phone.

The second card slot 4B has a cross section that corresponds in shape to the cross section of the new memory card 10B.

The second card slot 4B has a first housing portion 6002 and a second housing portion 6004. The first housing portion 6002 has dimensions corresponding to the thickness TgB of the guide portions 22 at both sides of the new memory card 10B and the distance WgB between the tips of the guide portions 22 at both sides. The second housing portion 6004 has dimensions corresponding to the thickness (ThB-TgB) and width WhB of the half portion of the body portion 20.

In more detail, in order to allow the insertion and removal of the new memory card 10B into and from the second card slot 4B, the first housing portion 6002 has a height H1B slightly greater than the thickness TgB of the guide portions 22, and a width W1B slightly greater than the distance WgB between the tips of the guide portions 22 at both sides.

The second housing portion 6004 has a height H2B slightly greater than the thickness (ThB-TgB) of the half portion of the body portion 20, and a width W2B slightly greater than the width WhB of the body portion 20.

Here, as noted previously, because ThA=ThB, LA=LB, WhA<WhB, TgA=TgB, and WgA=WgB, relationships in dimensions between the first card slot 4A and the second card slot 4B are as follows.

The height of the first housing portion 6002: H1A=H1B
The width of the first housing portion 6002: W1A=W1B
The height of the second housing portion 6004: H2A=H2B
The width of the second housing portion 6004: W2A<W2B As shown above, the dimensions of the first and second card slots 4A and 4B are different only in the width of the second housing portion 6004.

Accordingly, as shown in FIG. 8C, the old memory card 10A can be inserted into both of the first and second card slots 4A and 4B.

On the other hand, the new memory card 10B can be inserted into the second card slot 4B, but not into the first card slot 4A. In detail, because the width WhB of the body portion 20 of the new memory card 10B is greater than the width W2A of the second housing portion 6004 of the first card slot 4A, insertion of the new memory card 10B into the first card slot 4A is prevented.

The new memory card 10B according to the present embodiment has a very simple structure. That is, the new memory card 10B is simply different from the old memory card 10A in that the width whB of the body portion 20 of the new memory card 10B is greater than the width WhA of the body portion 20 of the old memory card 10A. Despite its simplicity, the structure of the new memory card 10B prevents the new memory card 10B from being inserted into the card slot of the electronic device that operates at a power supply voltage with which the new memory card 10B is not compatible.

This contributes to ensuring the prevention of malfunction, such as a failure of the memory card to operate as a result of the memory card being inserted into an electronic device that does not have a compatible power supply.

In addition, the electronic device 80 that has the second card slot 4B according to the present embodiment allows the use of both of the old and new memory cards 10A and 10B.

In the present embodiment, the case where the memory card is inserted into the card slot has been described. Note, however, that the card connector can also be structured in the above-described manner, and that the same beneficial effects as in the case of the card slot can naturally be obtained in the case where the memory card is inserted into the card connector.

Figure 9:
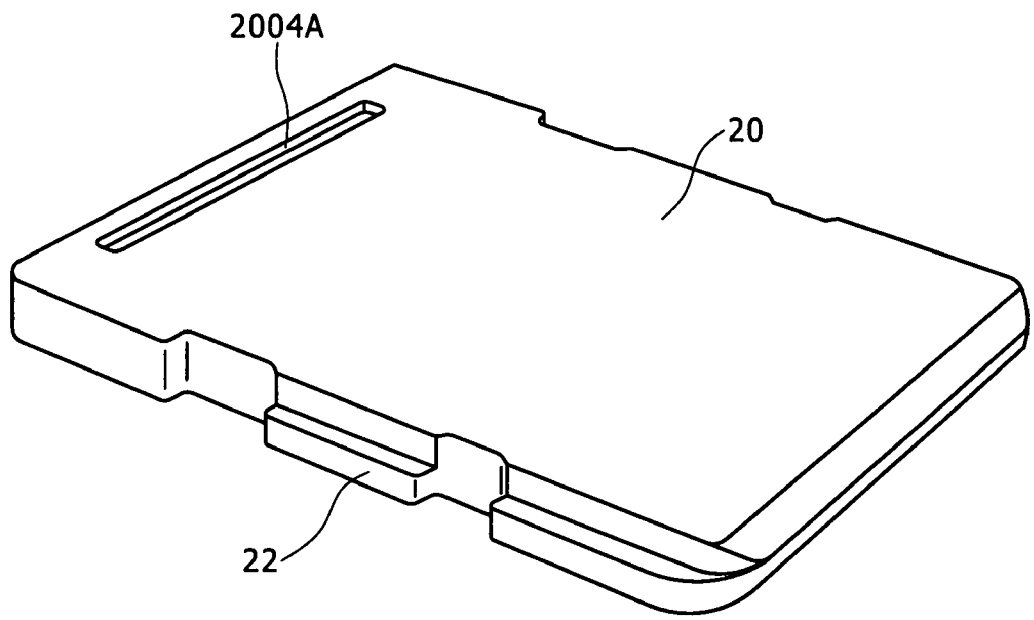
FIG. 9 is a perspective view illustrating a case where a recessed portion for finger-hooking use is provided on the new memory card.

Note that, as illustrated in FIG. 9, a recessed portion 2004A for finger-hooking use may be provided in place of the projection 2004 for finger-hooking use. In this case, however, the body portion 20 becomes thinner where the recessed portion 2004A is provided. This is unfavorable for securing space for wires and electronic components such as the storage section 1002, the controller 1004, and the power-supply IC 1006 contained in the body portion 20.

In contrast, in the present embodiment, as illustrated in FIGS. 3 and 5, the projection 2004 for finger-hooking use that projects from the one surface in the thickness direction of the body portion 20 and extends in the width direction is provided. Accordingly, when removing the memory card 10A or 10B from the card slot, a user can naturally hook a finger on the projection 2004 to make the removal of the memory card easier. In addition, the provision of the projection 2004 does not reduce the volume of the body portion 20 where the projection 2004 is provided, which is favorable for securing the space for the wires and the electronic components such as the storage section 1002, the controller 1004, and the power-supply IC 1006 contained in the body portion 20.

Figure 10:
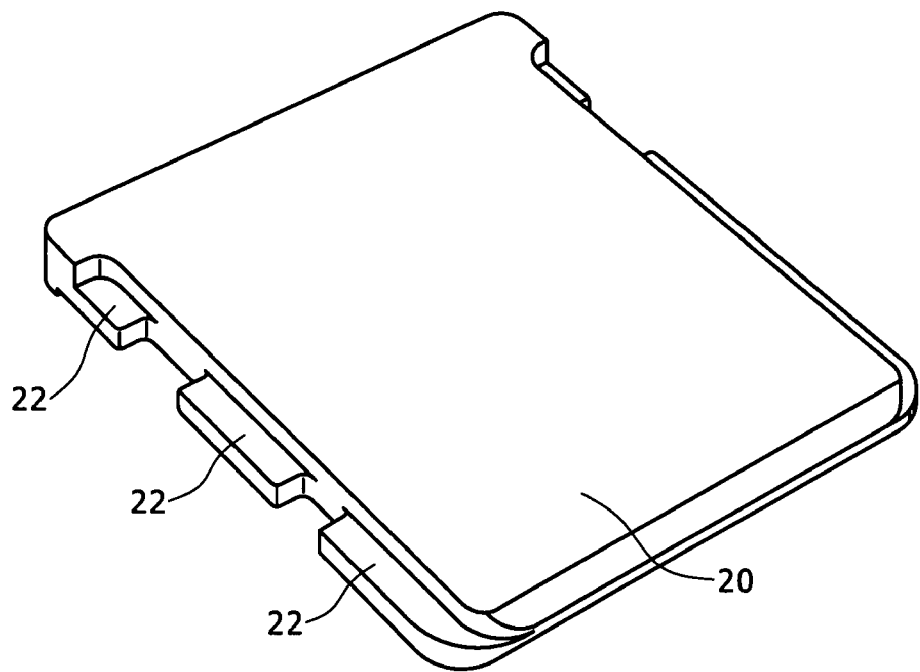
FIG. 10 is a perspective view illustrating a case where the guide portion is extended to a position close to a rear end of a body portion.

Also, referring to FIG. 10, extension of the guide portion 22 to a position close to the rear end of the body portion 20 would be unfavorable for securing the space for the wires and the electronic components such as the storage section 1002, the controller 1004, and the power-supply IC 1006.

In contrast, in the present embodiment, as illustrated in FIGS. 3 and 4, the bulging portions 2010 are provided that project from both sides of the body portion 20 to the same extent that the guide portions 22 project and which extend from the rear end of the body portion 20 in the forward direction. The provision of the bulging portions 2010 contributes to securing a greater volume of the body portion 20 where the bulging portions 2010 are provided, and is favorable for securing the space for the wires and the electronic components such as the storage section 1002, the controller 1004, and the power-supply IC 1006 contained in the body portion 20.

Figure 11A:
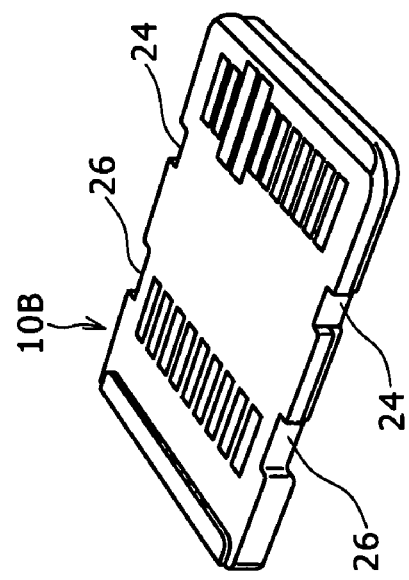
FIG. 11A is a perspective view of the old memory card.

Also, referring to FIG. 11A, the old memory card 10A has two recessed portions 24 and 26 on one side of the body portion 20 and one recessed portion 26 on the other side thereof. In contrast, the new memory card 10B has the two recessed portions 24 and 26 on each side (see FIG. 11B).

Accordingly, the one additional recessed portion 26 can be used to identify the type of the memory card, for example.

Figure 11C:
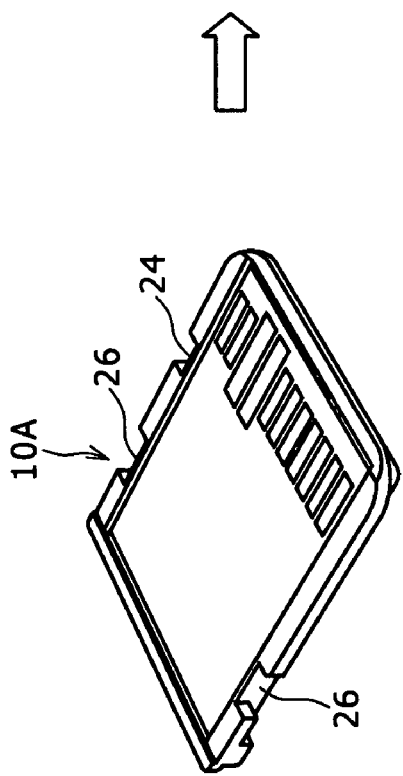
FIGS. 11C and 11D are diagrams illustrating an operation of detecting the new memory card by means of a detection switch.
Figure 11B:
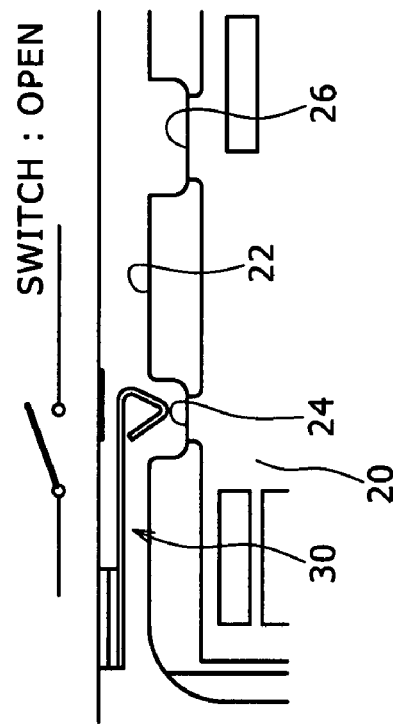
FIG. 11B is a perspective view of the new memory card.
Figure 11D:
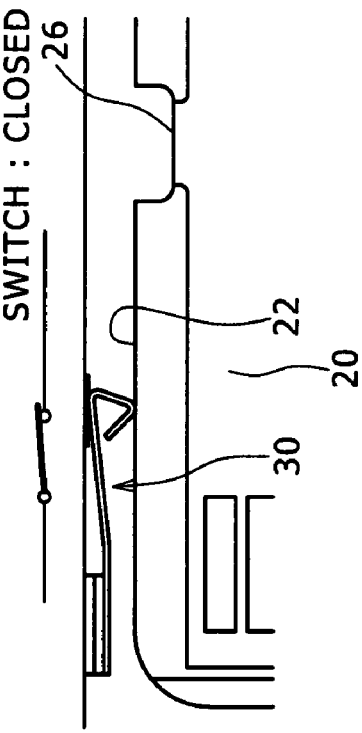

Specifically, referring to FIGS. 11C and 11D, a card slot or the card connector of the electronic device may be provided with a detection switch 30 for detecting the one additional recessed portion 26. This eliminates the need for a communication operation to be performed between the electronic device and the memory card for identifying the type of the memory card. This is favorable for increasing an operation speed of data communication performed between the memory card and the electronic device.

Next, with reference to FIGS. 12 to 19, the case where the new memory card 10B according to the present embodiment is contained in a body of the device will be described below.

Figure 14:
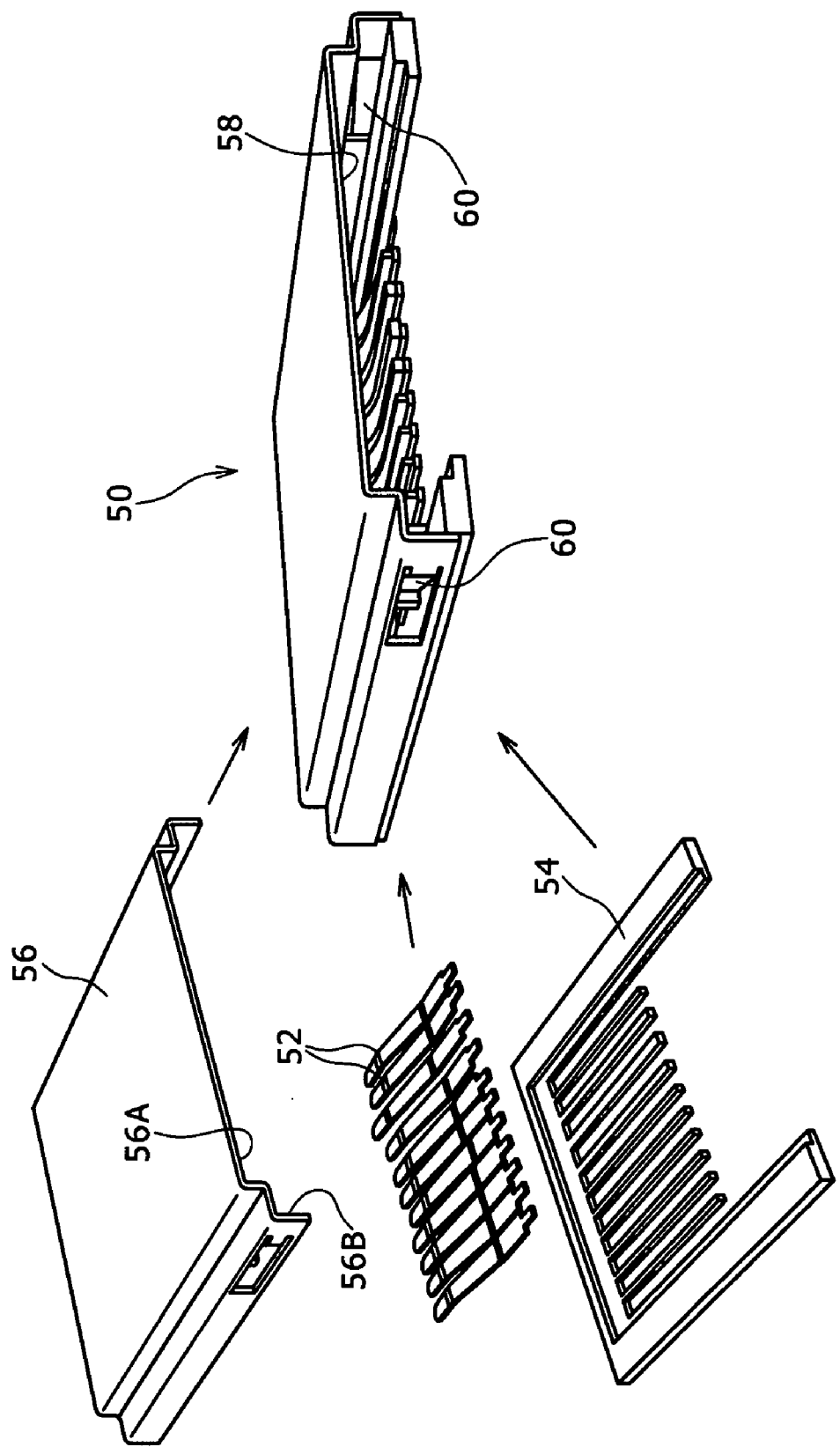
FIG. 14 is an exploded perspective view of the card slot.
Figure 15A:
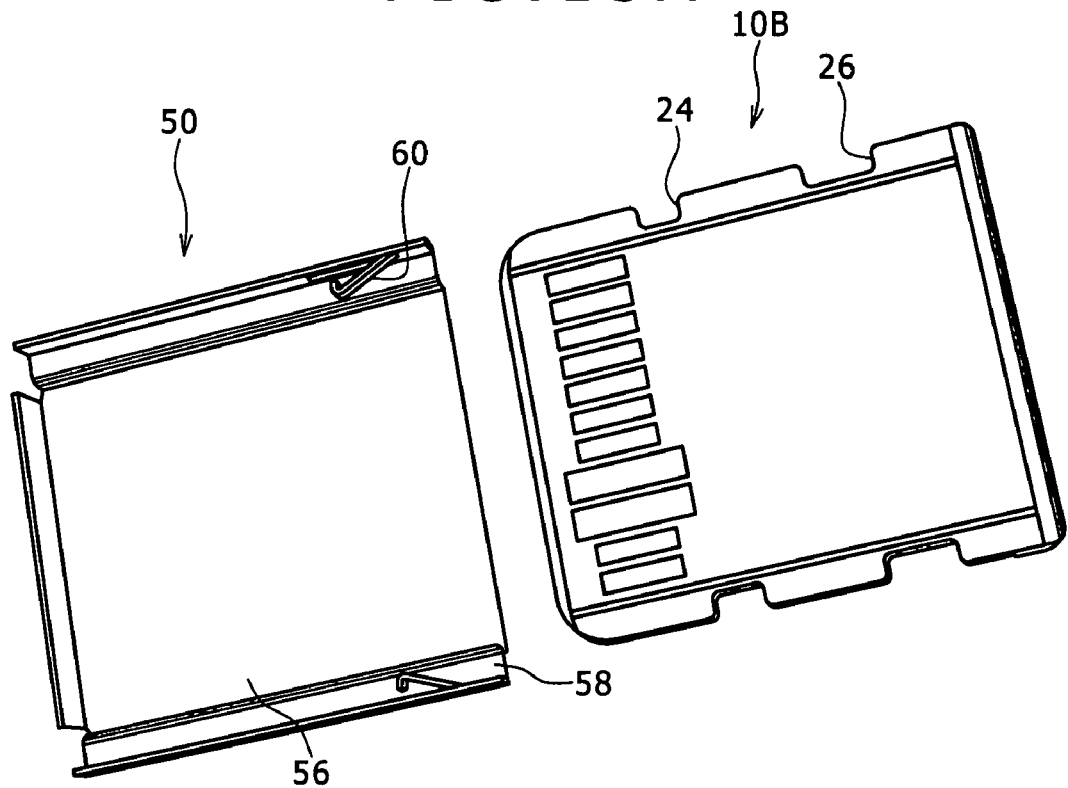
FIGS. 15A, 15B, 16A, and 16B are diagrams illustrating an operation of inserting the new memory card into the card slot.
Figure 15B:
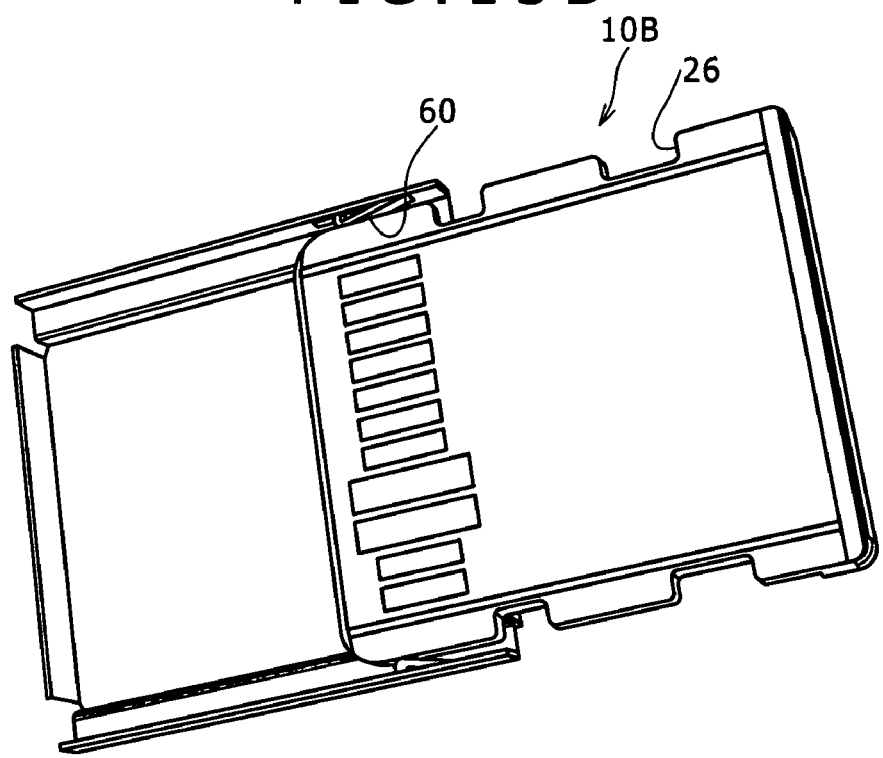
Figure 16A:
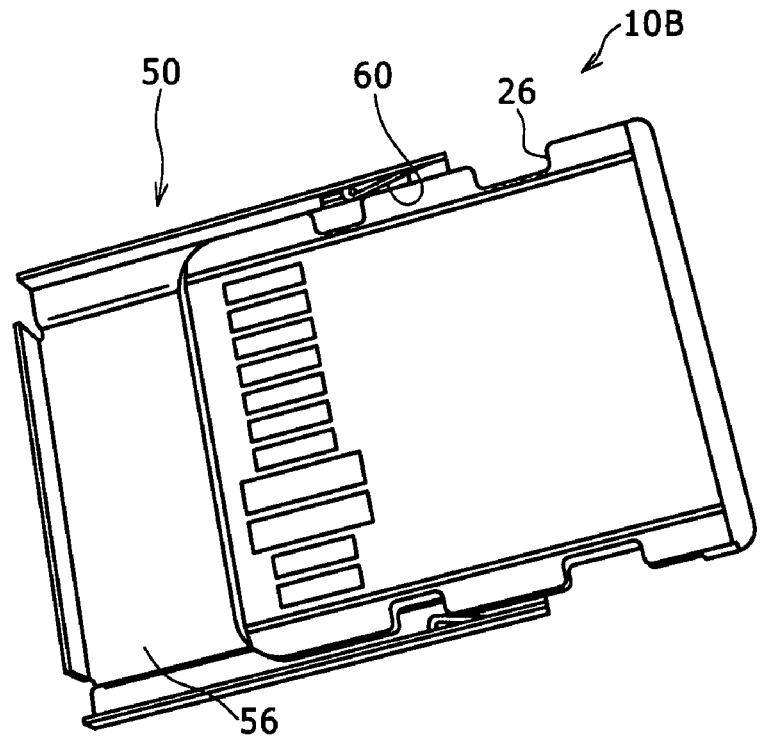
Figure 16B:
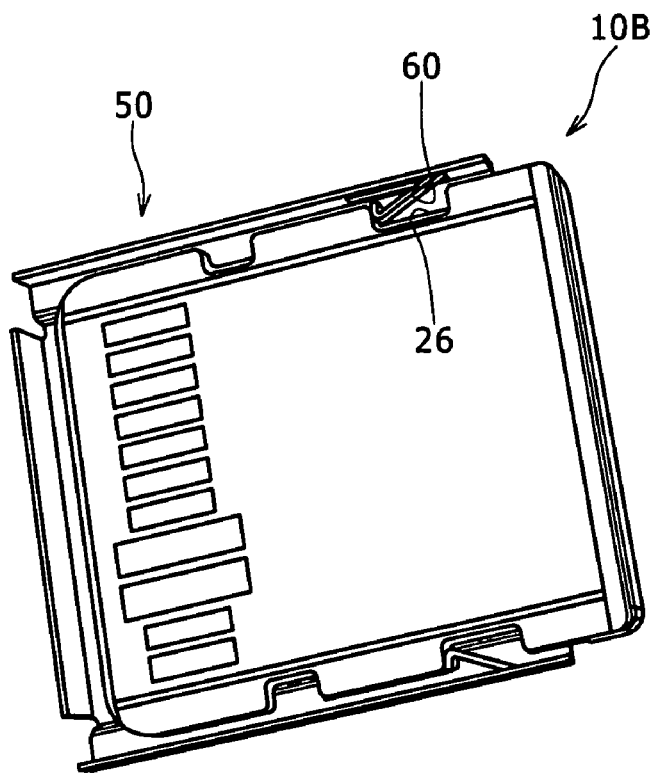
Figure 17:
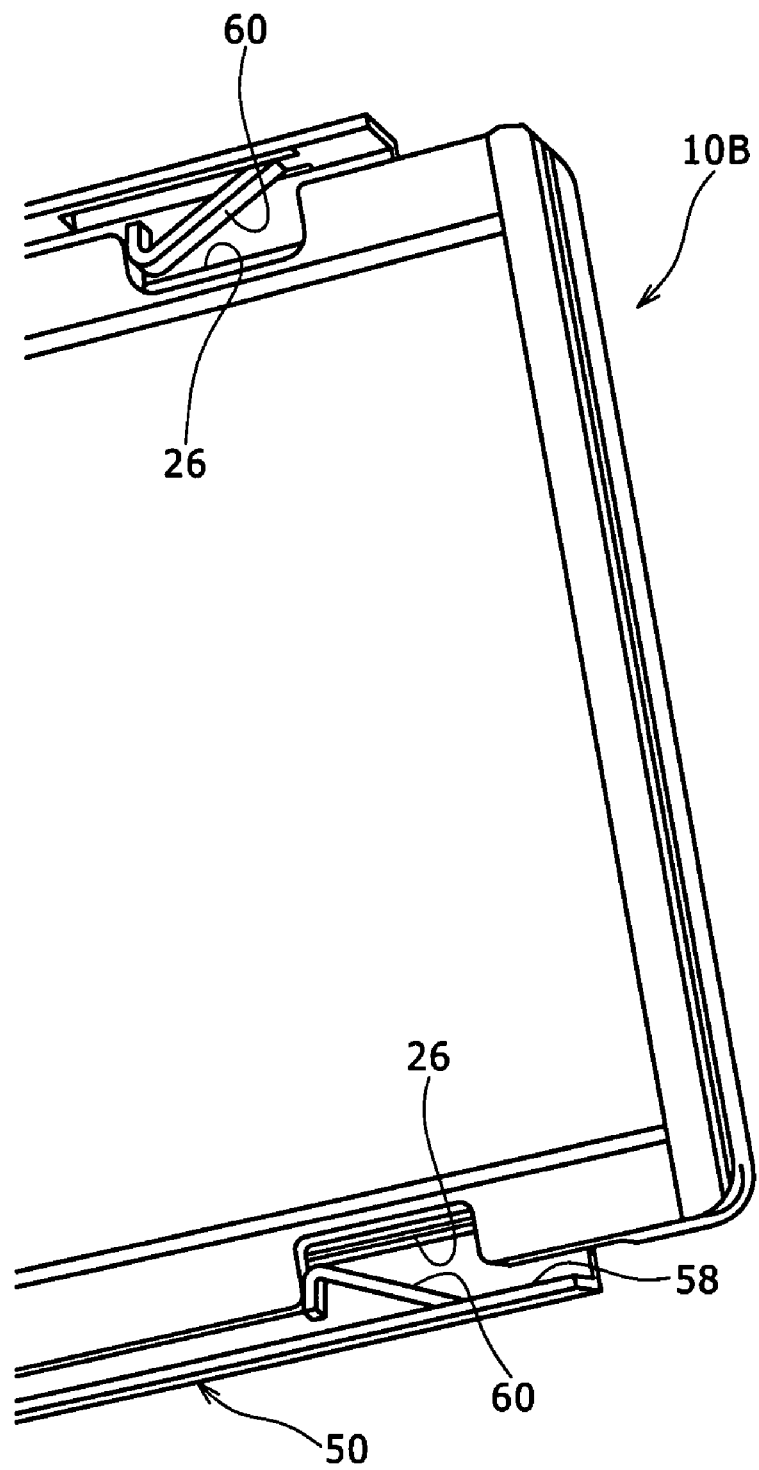
FIG. 17 is an enlarged view of important parts of the new memory card and the card slot when the new memory card is placed in the card slot.

FIGS. 12 and 13 are exploded perspective views of the new memory card 10B and a card slot 50. FIG. 14 is an exploded perspective view of the card slot 50. FIGS. 15A, 15B, 16A, and 16B illustrate an operation of inserting the new memory card 10B into the card slot 50. FIG. 17 is an enlarged view of important parts of the new memory card 10B and the card slot 50 when the new memory card 10B is placed in the card slot 50. FIGS. 18A, 18B, 18C, 19A, and 19B illustrate an operation of removing the new memory card 10B from the card slot 50. Note that in FIGS. 12 to 19B, of the contacts 16 of the new memory card 10B, the nine contacts 16 (16-11 to 16-20) placed close to the rear end of the body portion 20 are not shown, and that contacts 52 of the card slot 50 that correspond to the nine contacts 16 are not shown either.

In this case, the user normally does not insert and remove the new memory card 10B as in the above-described embodiment.

Referring to FIGS. 12 to 14, the card slot 50 to or from which the new memory card 10B is inserted or removed has a plurality of contacts 52, a holder 54 for holding the contacts 52, and a housing 56 to be attached to the holder 54.

The housing 56 has, at one end thereof, an insertion slot 58 for inserting the new memory card 10B.

Referring to FIGS. 13 and 14, the housing 56 has a housing upper portion 56A and a housing lower portion 56B. The housing upper portion 56A is used to guide an upper (in the thickness direction) half portion of the body portion 20. The housing lower portion 56B extends sideways beyond edges of the housing upper portion 56A, and has a width greater than the distance between the tips of the guide portions 22 at both sides. The housing lower portion 56B is used to guide the guide portions 22.

The housing lower portion 56B has locking pieces 60 provided at positions close to the insertion slot 58. When the new memory card 10B is placed in the card slot 50, the locking pieces 60 fit in the second recessed portions 26 of the new memory card 10B.

The locking pieces 60 are so shaped that once the new memory card 10B is placed in the card slot 50, the new memory card 10B may not be removed from the card slot 50 unless jigs described below are used.

Specifically, referring to FIGS. 15A, 15B, 16A, and 16B, when the new memory card 10B is inserted into the card slot 50 through the insertion slot 58, the guide portions 22 push the locking pieces 60 outward so that movement of the new memory card 10B into the card slot 50 is permitted.

Then, the locking pieces 60 project into the first recessed portions 24, but further movement of the new memory card 10B into the card slot 50 causes the guide portions 22 to push the locking pieces 60 outward again. Thus, still further movement of the new memory card 10B into the card slot 50 is permitted.

When the insertion of the new memory card 10B into the card slot 50 is eventually complete, each of the locking pieces 60 moves into the corresponding second recessed portion 26, and referring to FIG. 17, a part of the locking piece 60 that projects sideways locks against a front-end-side edge 2602 of the second recessed portion 26. Here, because the edge 2602 of the second recessed portion 26 extends sideways, the new memory card 10B may not be moved rearward as the locking piece 60 may not be pushed back sideways. Thus, subsequent rearward movement of the new memory card 10B is prevented.

When the insertion of the new memory card 10B into the card slot 50 is completed in the above-described manner, the contacts 16 of the new memory card 10B are connected to the contacts 52 of the card slot 50.

When removing the new memory card 10B from the card slot 50, the jigs as illustrated in FIGS. 18A to 18C and 19A and 19B are used.

The jigs are two boards 70 with a small thickness and width. Each of the boards 70 is inserted into an interspace between the housing lower portion 56B and the guide portion 22 of the new memory card 10B.

When the two boards 70 are inserted into the interspaces between the housing lower portion 56B and the guide portions 22 at both sides of the new memory card 10B, each of the locking pieces 60 is pushed sideways to be released from the corresponding second recessed portion 26.

Therefore, when the two boards 70 are inserted, it is possible to remove the new memory card 10B from the card slot 50.

In the embodiment described above with reference to FIGS. 12 to 19B, the case where the new memory card 10B is inserted into and removed from the card slot 50 has been described. Note, however, that the old memory card 10A can also be inserted into and removed from the card slot 50 in the above-described manners.

Therefore, according to the present embodiment, the memory card can be installed in various electronic devices as built-in memory for use. This contributes to improving usefulness of the memory card.

Also, the memory card can be easily removed from the card slot 50 by using the jigs. Therefore, when there is a need for repair or a change in storage capacity, it is easy to replace the memory card.

Note that similar effects to those described above can be obtained in the case where one locking piece 60, corresponding to one side of the memory card, is provided. However, when the two locking pieces 60 are provided each for a separate side of the memory card as in the above-described embodiment, the memory card can be placed more securely.

Figure 20:
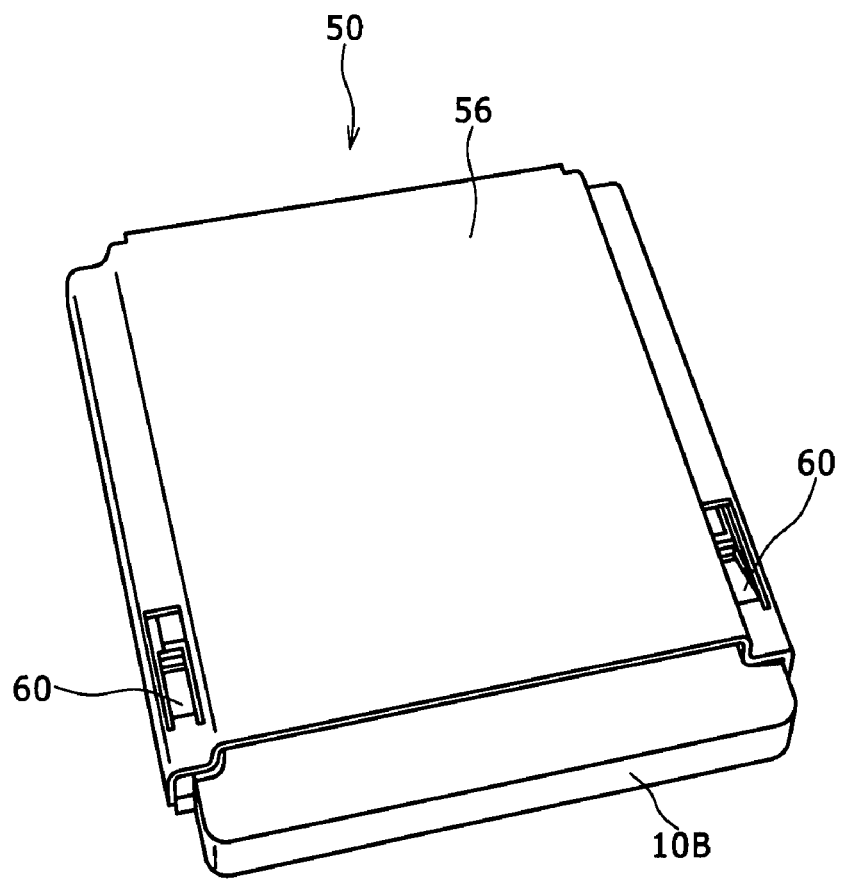
FIG. 20 is a perspective view of a variation of the card slot.

In the embodiment as described above with reference to FIGS. 12 to 19B, the case where the locking pieces 60 are pushed sideways (i.e., in the width direction of the new memory card 10B) has been described. However, as illustrated in FIG. 20, the locking pieces 60 may be pushed vertically (i.e., in the thickness direction of the new memory card 10B).

In this case, the new memory card 10B can be removed by placing the two boards 70 with a small thickness and width in the same orientation as that of the new memory card 10B (so that the thickness direction of the two boards 70 coincides with the thickness direction of the new memory card 10B) and inserting each of the two boards 70 along the length of the corresponding guide portion 22 in a space above or below the guide portion 22 so as to push outward the corresponding locking piece 60.

Such an embodiment also achieves similar effects to those of the above-described embodiment.

In the above-described embodiments, the format of the memory cards 10A and 10B has been assumed to be the Memory Stick Micro. Note, however, that, the format of the memory cards is not limited to the Memory Stick Micro.

Also, in the above-described embodiments, the storage section 1002 has been assumed to be the flash memory capable of data rewriting. Note, however, that this is not essential to the present invention. The storage section 1002 may be any storage device capable of data writing and/or reading.

It should be understood by those skilled in the art that various modifications, combinations, sub-combinations and alterations may occur depending on design requirements and other factors insofar as they are within the scope of the appended claims or the equivalents thereof.

What is claimed is:

1. A memory card that is a second memory card provided in connection with a first memory card that includes a body portion having a shape of a rectangular plate, and guide portions that project from both sides of the body portion in a width direction of the body portion and extend in a longitudinal direction of the body portion, each of the guide portions having a thickness less than a thickness of the body portion, the second memory card comprising:
- a body portion having a shape of a rectangular plate; and
- guide portions that project from both sides of said body portion of the second memory card in a width direction of said body portion and extend in a longitudinal direction of said body portion;
- wherein said body portion of the second memory card is equal in thickness and length to the body portion of the first memory card,
- a distance between tips of said guide portions of the second memory card is equal to a distance between tips of the guide portions of the first memory card, and
- said body portion of the second memory card has a width greater than a width of the body portion of the first memory card,
- said body portion and said guide portions of said first memory card being configured such that said first memory card is insertable into both a first card slot of a first electronic device and a second card slot of a second electronic device, and said body portion and said guide portions of said second memory card being configured such that said second memory card is not insertable into the first card slot of the first electronic device and is insertable into the second card slot of the second electronic device.

2. A memory card according to claim 1, wherein
said body portion of the second memory card has a substrate buried therein so as to form one surface of said body portion of the second memory card, and
said body portion of the second memory card has a set of contacts provided on a surface of the substrate that forms the one surface of said body portion, the set of contacts being provided close to an end of said body portion so as to be arranged in the width direction of said body portion.

3. A memory card according to claim 1, wherein
said body portion of the second memory card has a substrate buried therein so as to form one surface of said body portion of the second memory card, and
said body portion of the second memory card has two sets of contacts provided on a surface of the substrate that forms the one surface of said body portion of the second memory card, each set of contacts being provided close to a separate end of said body portion so as to be arranged in the width direction of said body portion.

4. A memory card according to claim 1, wherein each of said guide portions of the second memory card includes:
- a plurality of sub-guide portions spaced from each other in the longitudinal direction of said body portion of the second memory card; and
- a recessed portion that is formed between the sub-guide portions as a result of absence of the sub-guide portion thereat.

5. A memory card according to claim 1, wherein each of said guide portions of the second memory card includes:
- three or more sub-guide portions spaced from each other in the longitudinal direction of said body portion of the second memory card;
- a plurality of recessed portions that are formed between the sub-guide portions as a result of absence of the sub-guide portion thereat; and
- a plurality of said recessed portions spaced from each other in the longitudinal direction of said body portion are provided in both sides in a width direction of said body portion.

6. A memory card according to claim 1, wherein
said body portion of the second memory card has a substrate buried therein so as to form one surface of said body portion in a width direction of said body portion,
said body portion has a set of contacts provided on a surface of the substrate that forms the one surface of said body portion such that the set of contacts are arranged in the width direction of said body portion, and
each of said guide portions projects from a half portion of said body portion, the half portion including the surface formed by the buried substrate.

7. A memory card according to claim 1, wherein said body portion of the second memory card has a projection for finger-hooking use provided at an end of said body portion and on one surface of said body portion of the second memory card, the projection extending in the width direction of said body portion.

8. A memory card according to claim 1, wherein
said body portion of the second memory card has a substrate buried therein so as to form one surface of said body portion of the second memory card,
said body portion has of the second memory card a set of contacts provided on a surface of the substrate that forms the one surface of said body portion, the set of contacts being provided close to an end of said body portion of the second memory card so as to be arranged in the width direction of said body portion of the second memory card, and
said body portion of the second memory card has a projection for finger-hooking use provided at an end of said body portion of the second memory card and on the surface of said body portion of the second memory card on which the contacts are provided, the projection extending in the width direction.

9. A memory card according to claim 1, wherein
each of said guide portions of the second memory card ranges from one end of said body portion of the second memory card to a position closer to the other end of said body portion of the second memory card, and
said body portion of the second memory card has bulging portions provided at the both sides thereof so as to be adjacent to the other end thereof, the bulging portions projecting from the respective sides of said body portion of the second memory card to the same extent that said guide portions project, and extending in the longitudinal direction of said body portion of the second memory card.

10. A memory card according to claim 1, wherein
the first memory card is capable of operating at both a low power supply voltage and a normal power supply voltage higher than the low power supply voltage, and
the second memory card is not capable of operating at the low power supply voltage but is capable of operating at the normal power supply voltage.

* * * * *